United States Patent [19]
Tateno

[11] Patent Number: 5,812,999
[45] Date of Patent: Sep. 22, 1998

[54] APPARATUS AND METHOD FOR SEARCHING THROUGH COMPRESSED, STRUCTURED DOCUMENTS

[75] Inventor: Masakazu Tateno, Nakai-machi, Japan

[73] Assignee: Fuji Xerox Co., Ltd., Tokyo, Japan

[21] Appl. No.: 614,697

[22] Filed: Mar. 13, 1996

[30] Foreign Application Priority Data

Mar. 16, 1995 [JP] Japan .................................. 7-083534

[51] Int. Cl.$^6$ .................................................. G06F 17/30
[52] U.S. Cl. .................................. 707/3; 707/2; 707/101
[58] Field of Search ................................. 395/601–603; 707/1–3, 101

[56] References Cited

U.S. PATENT DOCUMENTS

| | | | |
|---|---|---|---|
| 4,682,150 | 7/1987 | Mathes et al. | 235/431 |
| 4,803,643 | 2/1989 | Hickey | 395/774 |
| 4,959,769 | 9/1990 | Cooper et al. | 395/616 |
| 4,985,863 | 1/1991 | Fujisawa et al. | 395/605 |
| 5,469,354 | 11/1995 | Hatakeyama at al. | 395/603 |
| 5,519,857 | 5/1996 | Kato et al. | 395/605 |
| 5,590,317 | 12/1996 | Iguchi et al. | 395/602 |
| 5,600,826 | 2/1997 | Ando | 395/611 |
| 5,623,681 | 4/1997 | Rivette | 395/788 |
| 5,644,776 | 7/1997 | DeRose et al. | 395/601 |
| 5,652,879 | 7/1997 | Harris et al. | 395/612 |

FOREIGN PATENT DOCUMENTS

A-5-135054   6/1993   Japan .

Primary Examiner—Paul R. Lintz
Assistant Examiner—M. N. Von Buhr
Attorney, Agent, or Firm—Oliff & Berridge, PLC

[57] ABSTRACT

An apparatus and method for searching through structured documents provides for inputting a structured document including a plurality of reference units, an adjacent two of which are partitioned by a tag. Then the reference units of the input structured document are divided, followed by compressing each of the reference units so divided, extracting at least one word from each of the reference units so divided, and generating tuples, each of which includes the location of one of the compressed reference units and at least the one word that was extracted from the reference unit corresponding to one of the compressed reference units. Search indexes are generated, each of which includes one word and at least one location of the compressed reference unit, including the one word out of the tuples, each of which includes the location of one of the compressed reference units and at least the one word that was extracted from the reference unit corresponding to the compressed reference unit. The search indexes so generated are stored in conjunction with a structured document, including the compressed reference units.

6 Claims, 6 Drawing Sheets

```
<!ELEMENT document    -- chapter*>
<!ELEMENT chapter     -- (title, (paragraph/figure)*,chapter*)>
<!ELEMENT title       oo (#PCDATA)>
<!ELEMENT paragraph   -o (#PCDATA)>
<!ELEMENT figure      -o (title, body of figure)>
<!ELEMENT body of figure -o EMPTY>
```

FIG.4
PRIOR ART

```
<document>

<chapter> What is SGML?

<paragraph> The SGML is a set of international linguistic
standards established in 1986 to regulate the expressive formats of
compute-ready documents. The standard is referred to as ISO 8879.

<paragraph> In recent years, the SGML has gained widespresd
acceptance globally and in the United States in particular.

<chapter> Expression of SGML Document

<paragraph> The SGML expresses a document structure by
embedding in text tags called start and end tags <figure> Typical SGML Document <body of figure>

</chapter>

</chapter>

</document>
```

FIG.5
PRIOR ART

```
<document>

<chapter><title> What is SGML? </title>

<paragraph> The SGML is a set of international linguistic standards
established in 1986 to regulate the expressive formats of compute-ready
documents. The standard is referred to as ISO 8879. </paragraph>

<paragraph> In recent years, the SGML has gained widespresd
acceptance globally and in the United States in particular. </paragraph>

<chapter><title>Expression of SGML Document </title>

<paragraph> The SGML expresses a document structure by
embedding in text tags called start and end tags. </paragraph>

<figure><title>Typical SGML Document </title><body of
figure></body of figure><figure>

</chapter>

</chapter>

</document>
```

FIG.6
PRIOR ART

APPARATUS AND METHOD FOR SEARCHING THROUGH COMPRESSED, STRUCTURED DOCUMENTS

BACKGROUND OF THE INVENTION

1. Field of the Invention

The present invention relates to an apparatus and a method for searching through structured documents and, more particularly, to an apparatus and a method for storing the words constituting the text of a structured document provided with tags, generating retrieval indexes accessible per every reference unit divided by the tags, compressing the text per every reference unit to reduce the memory capacity of the text and for efficiently searching for and retrieving any of the words thus stored.

2. Discussion of the Related Art

With conventional document editing apparatuses operating on a workstation (such as a word processor), attempts have been made to structure documents for efficient document preparation. Specifically, the content of each document is partially divided in advance using tags into a plurality of such document elements as headings and paragraphs. The relationship between these elements is properly defined so as to structure the document for subsequent editing.

One such structured type of documents is stipulated as the ODA (Open Document Architecture) under ISO 8613 and another structured document type as the SGML (Standard Generalized Markup Language) under ISO 8879. A document retrieval method disclosed in Japanese Patent Laid-Open No. Hei. 5-135054 (1993) involves the use of structured documents complying with the ODA standards.

SGML-based structured documents are highly compatible with conventional text processing systems and have gained widespread acceptance globally and in the United States in particular; SGML is already at the stage of practical application. Structuring documents in compliance with the SGML involves the use of marks called tags inserted into document text so as to divide the text partially (e.g., into document elements). The relationship between such document divisions is defined appropriately to represent a tree-type document structure.

Below is a description of how SGML-based structured documents furnished with tags are typically processed. In order for documents to be structured in SGML, a structural prototype is provided in advance. The structure of documents is constrained within the scope of the prototype thus furnished. Under the SGML standards, the document structure prototype is called the document type definition (DTD).

In the DTD, each of the elements making up a document is equipped with a generic identifier for identification purposes. In an actually structured documents, these generic identifiers serve as tags that designate the beginning and the end of each element. In other words, a tag is a DTD-defined generic identifier.

To structure a document in SGML requires first defining its document type. Marks called tags are then inserted into the text of the document to express its structure. The tags are used to divide partially the document text. For example, a paragraph of the document is expressed using a tag called <paragraph>, as follows:
<paragraph> This is a paragraph. </paragraph>

In the above example, the tag <paragraph> stands for the beginning of the paragraph and is called a start tag. Another tag </paragraph> denotes the end of the paragraph and is called as an end tag. That is, the example above shows a paragraph marked with the start tag <paragraph> and the end tag </paragraph>, distinguished partially as an element of the document text. The text portion flanked by the two tags represents a partial content of the tag-designated document structure.

Tags have their proper names and are thereby distinguished from one another. Within a document, these tags have their structural locations defined by the DTD. In that sense, the tags express the structure (i.e., elements) of the document. Thus unless otherwise noted to avoid confusion, the structure of the SGML-based structured document is considered synonymous with the tags in the specification that follows.

In the SGML-based structured document (hereinafter called the SGML document), some tags may be omitted. Whether or not a given tag is omissible is designated by the DTD. The omission of a start tag and that of an end tag may be designated independently from each other. Illustratively, the end tag </paragraph> is omissible when so designated within the DTD. In that case, the example shown earlier may be rewritten to:
<paragraph> This is a paragraph.

A typical example of an SGML document in its DTD format is shown in FIG. 4. The document structure defined by a document type definition (DTD) 40 in FIG. 4 stipulates that a start tag named "title", an end tag "title", an end tag "paragraph", and end tag "figure" and an end tag "body of figure" are omissible.

The content of the DTD 40 in FIG. 4 is further described below in more detail. The DTD here is described according to the SGML notation and is thus interpreted according thereto. Specifically, the first symbols "<!" on each line of the DTD content constitute a markup declaration delimiter. The word "ELEMENT" following the markup declaration delimiter without blank is an element declaration keyword. The first delimiter and element "<!ELEMENT" designate how the content of the structure (i.e., subordinate structure) is to be determined by the subsequent description. The names given to the items that follow (document, chapter, title, paragraph, figure, etc.) represent the names of the tags for these items.

The ensuing symbols ("- - ", "- ○", "○○", etc.) indicate whether or not the start and end tags, in that order, of the respective items are omissible. The symbol "-" indicates that the tag cannot be omitted and the symbol "○" shows that the tag may be omitted. For example, the symbols "- ○" for a given item indicate that the end tag is omissible but the start tag is not.

The next item is a definition of the rules representing the subordinate structure of the corresponding tag. The symbol "," means that the subsequent items (i.e., tags) appear in order. The symbol "|" indicates whichever of the items in question may be selected for use. The symbol "*" denotes zero or more times of repetition. The symbol "?" means that the use of the item in question is optional.

For example, if the subordinate structure of a tag is defined as "(chapter title, paragraph*, chapter*)", it means a subordinate structure wherein a paragraph is repeated zero or more times after the chapter title, followed by a chapter repeated zero or more times. Furthermore, if the subordinate structure of a tag is defined as "(title, (paragraph|figure)*, chapter*)", as on the second line of the DTD 40 in FIG. 4, it means a subordinate structure wherein a paragraph of figure is repeated zero or more times after the title, followed by a chapter repeated zero or more times.

A tag subordinate structure "#PCDATA" on the third and fourth lines is one of the reserved words in the SGML. This reserved word means that the content of the structural definition is character data. Thus in the case of the DTD 40 in FIG. 4, the reserved word stipulates that character data comes below the tags "title" and "paragraph" constituting the chapter.

In the document structure prototype defined by the DTD of FIG. 4, the document in question begins with the start tag "<document>" and comprises repeated chapters. Each of the chapters includes a title followed by a "paragraph" or "figure" repeated zero or more times, which in turn is followed by a "chapter" again repeated zero or more times. The titles and paragraphs are composed of character data.

More specifically, the content of the "figure" in the structured document is made up of a "title" and a "body of figure" that follows it. The "body of figure" refers illustratively to an external image file and is thus defined as having no subordinate structure ("EMPTY"). Whether or not the tags are omissible in this structure is defined as follows: no tags are omissible for the "document" and "chapter"; the end tag alone is omissible for the "paragraph", "figure" and "body of figure"; and the start and end tags are omissible for the "title".

A representative actual document in compliance with the above DTD (that document is called a target document hereunder) is illustratively shown in FIG. 5 as an SGML document 50. In the document of FIG. 5, the indentation is made to vary with the structural depth of the document. This kind of indentation is provided to facilitate the explanation of and the understanding about the structured document. In practice, such indentation is often omitted.

A look at the SGML document 50 (a typical structured document) in FIG. 5 lets one understand that neither the start tag nor the end tag for the subordinate structure "title" of the "chapter" appears in this document. In fact, a start tag "<title>" is omitted between the tag "<chapter>" in the second line on the one hand, and its content "What is SGML?" on the other. Whether or not such a tag is omitted can only be known by referring to the DTD 40. That is, the exact structure of the target document can be read only in conjunction with the DTD furnished thereto.

Because of such tag omissions, an attempt to process an SGML document requires initially analyzing the document structure (i.e., syntax analysis by the SGML parser). In analyzing the structure of the target document, the parser refers to the DTD primarily to restore the tags omitted from that document. During syntax analysis of an actual document, other kinds of processing are also carried out (e.g., restoration of attributes, development of entities).

Suppose that the SGML document 50 of FIG. 5 is subjected to the process of restoring tags (i.e., structure). The process results in an SGML document 60 of FIG. 6. In the SGML document 60, the underlined parts indicate restored tags (structure). This target document is acquired by referring to the DTD 40 and thereby restoring the omitted tags. Specifically, under the rules of defining the "chapter" structure, the tag <title> must exist after the tag <chapter> and thus the tag <title> is restored following the tag <chapter>. Similarly, the tag <title> must exist after the tag <figure> and thus the tag <title> is restored following the tag <figure>. Because each end tag is omitted, the respective end tags are restored after the contents (</title>, </paragraph>, etc., before the next corresponding tag). In this manner, the omitted tags (structure) are restored as shown underlined.

With the tags restored as described to represent the SGML document 60 structurally, the document structure is searched through in the manner described below. In editing a structured document, major processing is not limited to searching through text character strings; a search through the document structure is also important. The reason for this is that during processing of structured documents, editing is actively performed through the use of the document structure.

In searching through a structured document, the conventional search through character strings is thus supplemented by the effective use of the document structure for search process. For example, if an SGML-related figure needs to be retrieved from within a document, the conventional process involves searching through the entire document (i.e., character string search) to find and retrieve the character string "related figure" from the text.

By contrast, if the structure of a structured document is used for search purposes, it is possible to search for structural features such as "a figure whose title includes SGML" and "a title as the subordinate structure of a figure", whereby the scope of search and retrieval is narrowed down. Because of the limited scope for search and retrieval as per the document structure, the efficiency of the process is enhanced.

As described above, SGML documents have a tag-embedded architecture wherein text is simply marked. As such, SGML documents are highly compatible with conventional text processing systems. Because their structure is simply expressed by marked tags, the SGML documents require no specialized apparatus or programs when structurally searched through. The conventional character string search function may be utilized to search through tag character strings and hence through the document structure. In other words, conventional text processing systems (e.g., document editor) may create SGML documents. The documents thus created are structurally searched through by use of the conventional text searching method (for character string search) adapted to the search through tag character strings.

Tagged documents, notably those in SGML format, are becoming standard today and finding their way into many fields and applications. The tagged documents are documents that express in tags the markups representing format information and other document-related structural information. Because the contents of these documents are structured according to common SGML standards, it is easy to use the contents for widespread interchanges. This kind of documents has started circulating extensively in and out of business offices, government offices, schools and other institutions. When such tagged documents are electronically processed and accumulated, massive resources of electronic documents will be built up and become available for widespread use.

However, there exist problems with the above kind of document architecture. When necessary information is to be retrieved from tagged documents such as SGML documents, structural search is readily executed by use of tags but textual search is still limited to the conventional full text search or the like. That is, the contents of the documents are not yet to be searched through as efficiently as their structure. Since the use of tags allows the locations of structural portions in the document structure to be identified, such tags may be utilized as delimiters of reference units for search and retrieval. This arrangement will allow the contents of documents to be retrieved and utilized more efficiently than before.

SUMMARY OF THE INVENTION

The present invention has been made in view of the above circumstances and has as an object of provision of an apparatus and method for searching through structured documents which overcome the above and other deficiencies and disadvantages of the prior art. The apparatus and method store the words constituting the text of a structured document provided with tags, generate search indexes accessible per every reference unit divided by the tags compress the text per every reference unit to reduce the memory capacity of the text for efficient search and retrieval of any of the words thus stored.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a structured document searching apparatus of this invention comprises document inputting means for inputting a structured document including a plurality of reference units, adjacent two of which are partitioned by a tag, dividing means for dividing into the reference units the structured document input by the document inputting means, compressing means for compressing each of the reference units divided by the dividing means, word extracting means for extracting at least one word from each of the reference units divided by the dividing means, tuple generating means for generating tuples each of which includes the location of one of the compressed reference units compressed by the compressing means and at least one word extracted by the word extracting means from the reference unit corresponding to the compressed reference unit, search index generating means for generating search indexes each of which includes one word and at least one location of the compressed reference unit including the word out of the tuples each of which includes the location of one of the compressed reference units compressed by the compressing means and at least one word extracted by the word extracting means from the reference unit corresponding to the compressed reference unit, and storing means for storing the search indexes generated by the search index generating means, in conjunction with a structured document including compressed reference units compressed by the compressing means. A structured document searching method of the present invention the steps of (a) inputting a structured document including a plurality of reference units, adjacent two of which are partitioned by a tag, (b) dividing into the reference units the structured document input in the step (a), (c) compressing each of the reference units divided in the step (b), (d) extracting at least one word from each of the reference units divided in the step (b), (e) generating tuples each of which includes the location of one of the compressed reference units compressed in the step (c) and at least one word extracted in the step (d) from said reference unit corresponding to the compressed reference unit, (f) generating search indexes each of which includes one word and at least one location of the compressed reference units including one word out of the tuples each of which includes the location of one of the compressed reference units compressed in the step (c) and at least one word extracted in the step (d) from the reference unit corresponding to the compressed reference unit, and (g) storing the search indexes generated in the step (f), in conjunction with a structured document including compressed reference units compressed in the step (c).

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 4 is a view of a representative document type definition (DTD) in SGML format;

FIG. 5 is a view of a typical tagged SGML document whose tags are omitted; and

FIG. 6 is a view of a typical SGML document whose omitted tags has been restored.

DETAILED DESCRIPTION OF THE PREFERRED EMBODIMENT

Preferred embodiment of an apparatus and method for searching through structured documents according to the present invention is now described in detail based on the drawings.

First Embodiment

Figure 1:
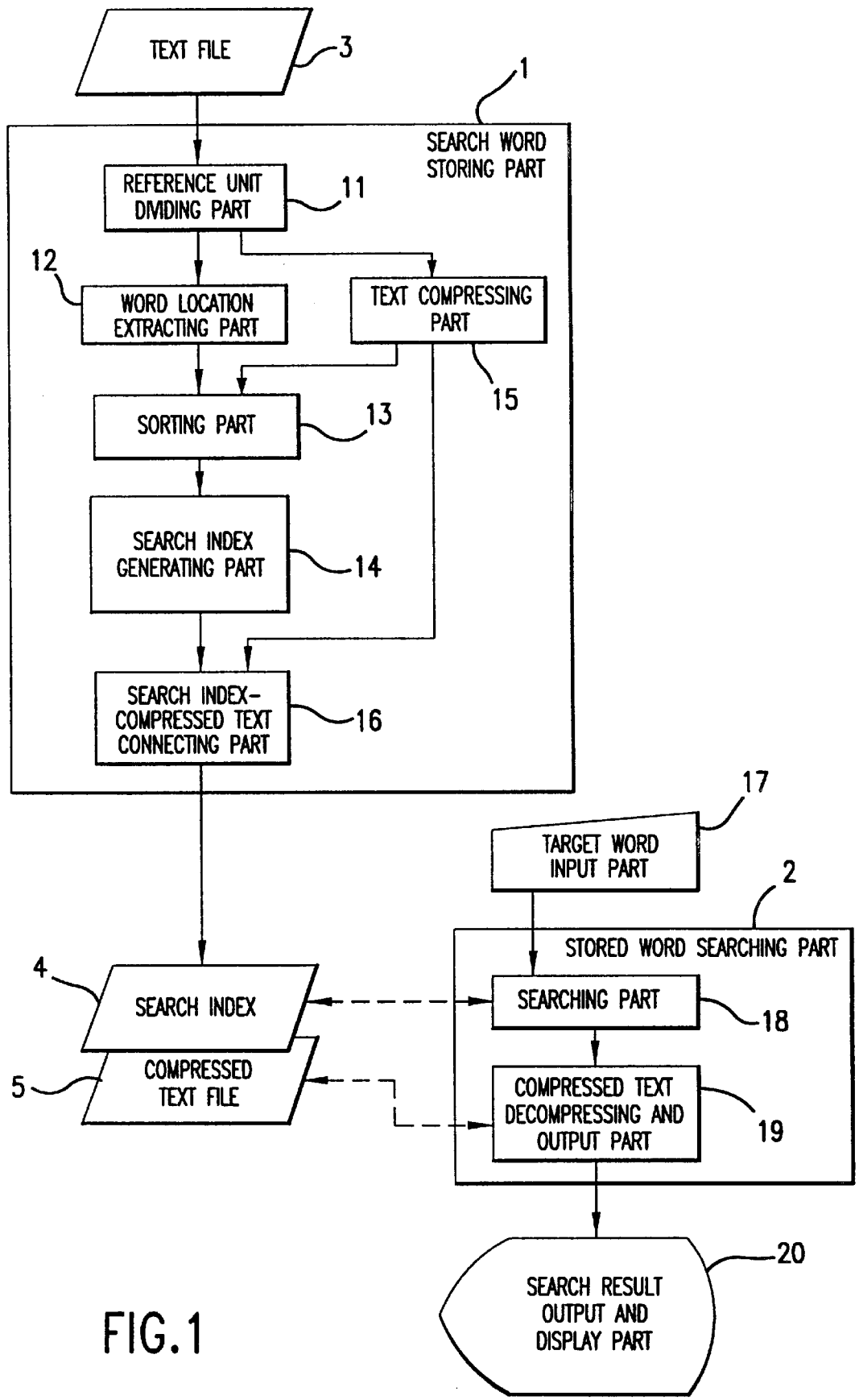
FIG. 1 is a block diagram outlining a structured document searching apparatus practiced as an embodiment of the present invention.

FIG. 1 is a block diagram showing major portions of a structured document searching apparatus practiced as the first embodiment. In FIG. 1, reference numeral 1 is a search word storing part; 2 is a stored word searching part; 3 is a text file of a tagged document; 4 is a search index attached to a compressed text file; 5 is the compressed text file; 11 is a reference unit dividing part; 12 is a word location extracting part; 13 is a sorting part; 14 is a search index generating part; 15 is a text compressing part; 16 is a search index-compressed text connecting part; 17 is a target word input part; 18 is a searching part; 19 is a compressed text decompressing and output part; and 20 is a search result output and display part.

The compression is execution of Huffman coding corresponding to the number of types of character used in a structured document to be stored and statistics of frequency in appearance of every character. Decompression is carried out by decoding the Huffman code. The unit of encoding will be described in detail. The Japanese characters are usually expressed by 16-bit code. In the process of compression here, 16-bit code is converted into a code divided into every 4-bit unit called a nibble. The bit number of the unit is determined by taking the code amount and easy processing brought about by enabling processing with half of the 8-bit unit processible by a general computer into consideration though the ultimate Huffman coding is carried out per every 1-bit unit.

Before the first embodiment allows any target word to be input for retrieval from text, the search word storing part 1 compress the text file 3 per every reference unit to generate a compressed block and stores the words to be searched through from the text file 3 of a tagged document, thereby creating the search index 4 to be attached to the compressed block generated by compressing the text file per every reference unit. With the search index 4 attached to the compressed block of the text file 3, the stored word searching part 2 searches for the target words in the text by use of the search index 4. This process will be described below in more detail with reference to FIG. 1.

The search word storing part 1 first enters the text file 3 of the tagged document into the reference unit dividing part 11. Given the text file 3, the reference unit dividing part 11 divides the text into reference units delimited by tags. The text divided into reference units is received by the word location extracting part 12. From the received text, the word location extracting part 12 extracts in pairs the location of each target word and the location of the reference unit in which that word appears.

The text compressing part 15 compresses the text of each of the reference unit divided by the reference unit dividing part 11 to generate the compressed block. Since each of the divided reference units is related to a tag location, a the compressed block starting location of each reference unit is related to the location of corresponding tag in the compressing process of text of each reference unit.

The sorting part 13 then sorts by word the pairs of extracted words and compressed block locations (reference unit locations), in order to generate sets of word locations having tuples comprising the locations of all compressed blocks in which the target word appears, as will be explained later. Given the sets of word locations thus obtained, the search index generating part 14 generates the search index 4 allowing sets of compressed block locations to be acquired from words.

The search index-compressed text connecting part 16 connects the compressed text file 5 generated by compressing the text of the text file 3 to corresponding search index 4, thus preparing the compressed text file 5 equipped with the search index 4. Given the compressed text file 5 equipped with the search index 4, the stored word searching part 2 searches through the index to acquire quickly the location of any compressed block (reference unit), whereby the content of the applicable reference unit is displayed immediately by decompressing and outputting the compressed blocks by the compressed block decompressing and outputting part 19, as will be explained later.

When the text file is to be searched through for a target word, the target word input part 17 first enters the target word into the stored word searching part 2. Given the target word, the searching part 16 then searches for the target word through the search index 4 attached to the compressed text file 5, retrieving sets of the locations of compressed blocks in which the target word appears. With the locations of the compressed blocks searched for and retrieved, the compressed text decompressing and outputting part 19 decompress the compressed block and outputs the content of the text of the reference unit thus obtained by accessing the compressed text file 5 in accordance with the compressed block locations. The applicable reference unit is output and displayed by the search result output and display part 20.

As described, when the text file 3 of the tagged document is input to the reference unit dividing part 11 of the search word input part 1, the reference unit dividing part 11 divides the text into reference units delimited by tags. That is, the reference unit dividing part 11 acquires the reference units and their locations out of the text file. The text compressing part 15 compresses the text of the reference unit and relates the location of the compressed block of the compressed text and the location of the reference unit. The word location extracting part 12 receives the compressed block location related to the reference unit as its input, and pairs all words included in the reference units with the locations of those compressed blocks in which the words appear. For each of the words involved, the sorting part 13 acquires word-compressed block location pairs (sets of words and compressed block locations), which are tuples of locations, in the locations of all compressed blocks wherein the word in question appears. From all pairs (sets of words and compressed block locations), the search index generating part 14 generates a set of compressed block locations with respect to every word, whereby the search index 4 is prepared.

Every word in the document is thus stored in the search index 4 together with information about the location of the compressed block (reference unit). When a target word to be searched for and retrieved is supplied, a search through the search index 4 makes it possible immediately to retrieve the compressed block location of the reference unit applicable to that word in the document, whereby a partial content of the document is output and displayed in the form of a reference unit by decompressing the compressed block in accordance with the compressed block location.

The partial content of the document represents specifically the reference unit that contains the target word to be searched for and retrieved. This is a document element sandwiched between the start tag immediately before the target word and the end tag completing that start tag. The reference units to be displayed are searched through in the direction opposite to that in which the start tag preceding each word in question is generally read. A given reference unit may thus be extracted by searching through end tags for that end tag which completes the start tag in question in the forward direction starting from the target word to be searched for and retrieved.

Figure 2:
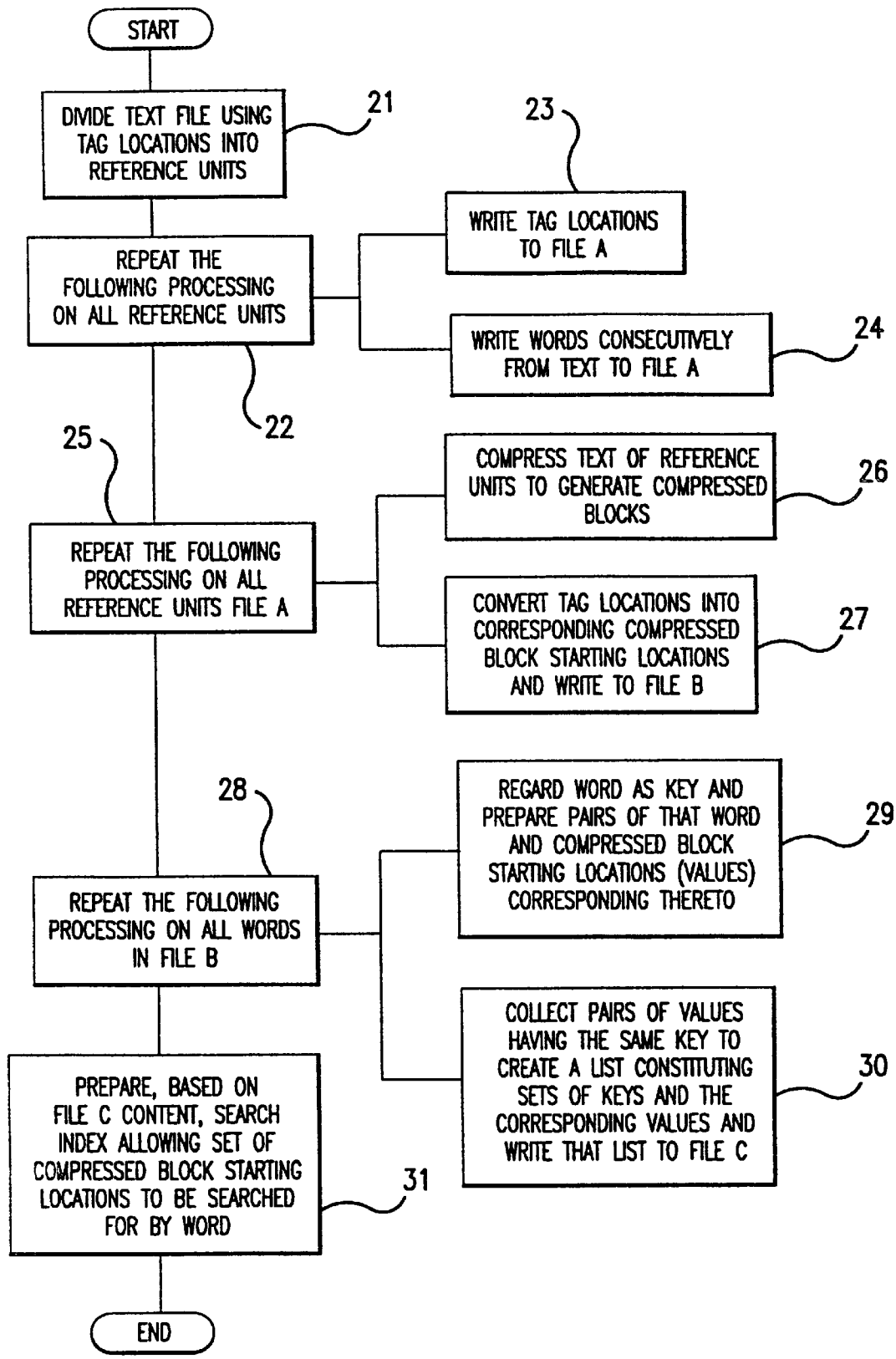
FIG. 2 is a problem analysis diagram (PAD) showing the flow of a process for preparing a search index of a text file through the use of the embodiment.
Figure 3:
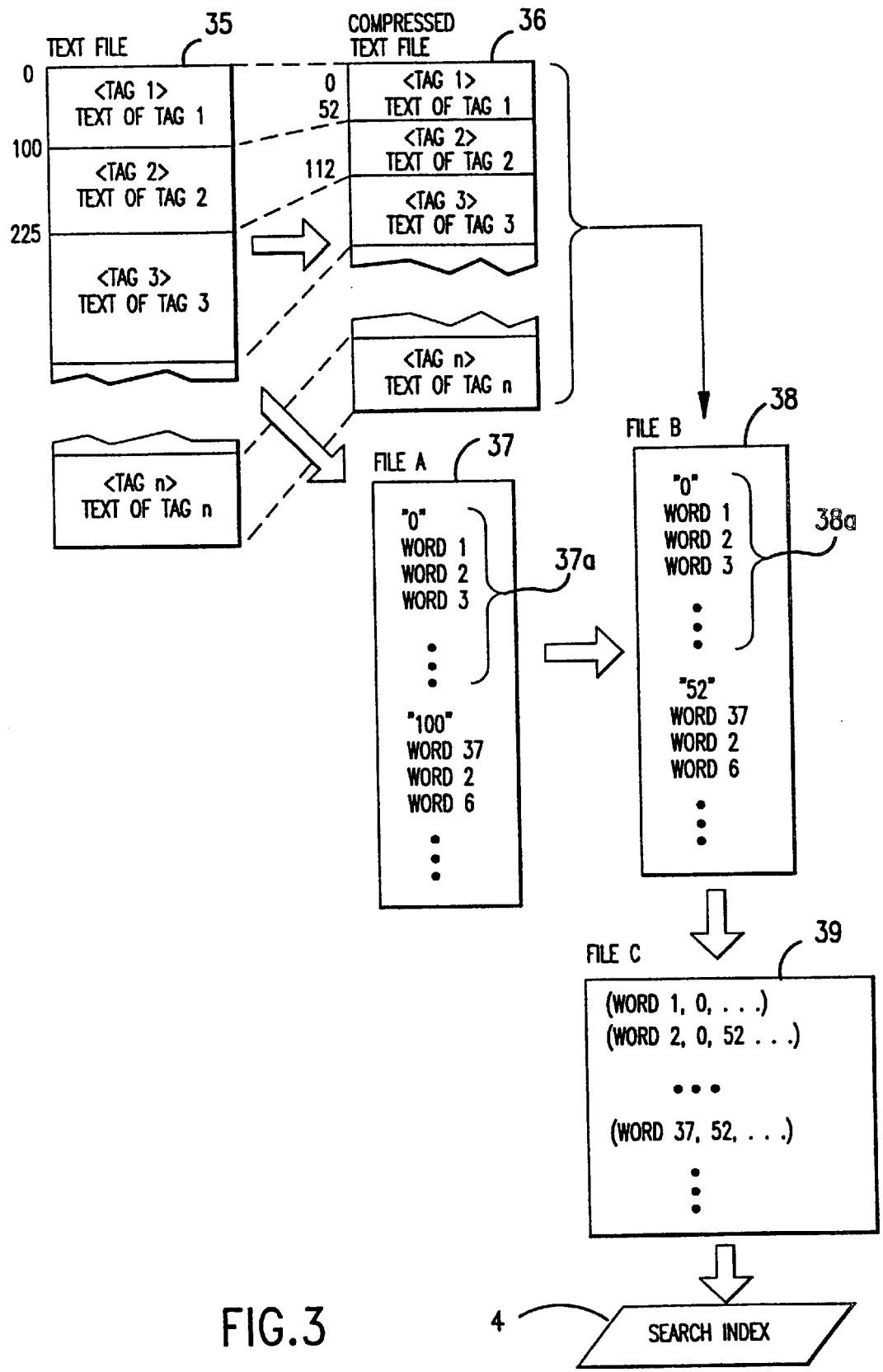
FIG. 3 is a view specifically illustrating major steps in the process of FIG. 2 for preparation of the search index.

FIG. 2 is a problem analysis diagram (PAD) showing the flow of the process for preparing a search index of a text file through the use of the first embodiment. FIG. 3 specifically indicates major steps in the process of FIG. 2 for preparation of the search index. Described below with reference to FIGS. 2 and 3 is how to prepare a typical search index using the first embodiment for searching through the stored words of a structured document.

The flow of the process for preparing a search index of a text file using the first embodiment will now be outlined with reference to FIG. 2. When the processing begins, a process block 21 is first reached. The block 21 divides a text file 35 into reference units using the locations of tags. After division of text into reference units, the tag locations are stored temporarily. Then a control block 22 is reached for repeated processing. The control block 22 causes subsequent process blocks 23 and 24 to be performed repeatedly on all tag locations and the tag-delimited text portions paired therewith.

Under control of the control block 22, the process block 23 writes to a file A the tag locations of the reference units to be processed. The process block 24 writes the words from the text of the applicable reference units consecutively to the file A following the previously written words tag locations therein. That is, in the file A, each tag location is followed by consecutively written words from the text of each reference unit. Such processing is performed repeatedly on all reference units under control of the control block 22. As a result of this, as shown in FIG. 3, the tag location of each reference unit is first written to the file A 37 from the text file 35. Each of the tag locations is followed consecutively by the words from the text of the reference unit corresponding to the tag location in question. This results in the file A 37 having a data content comprising as many tag locations along with the ensuing word tuples 37a as the number of the reference units involved.

After the file A has been created in the manner described, a control block 25 is reached for another repeat processing. Under control of the control block 25, subsequent process blocks 26 and 27 are carried out repeatedly on all tag locations and the tag-delimited text portions paired therewith.

In the repeat processing controlled by the control block 25, the process block 26 compresses the text of the reference unit to be processed, thus generating a compressed block. The process block 27 converts the tag location of the reference unit to be processed into a starting location of the corresponding compressed block and writes it to a file B. That is, in the file B, the starting location of each compressed block is followed by consecutively written words from the text of the compressed block of each reference unit. Such processing is performed repeatedly on all reference units (compressed blocks) under control of the control block 25. As a result of this, as shown in FIG. 3, a compressed text file 36 per every compressed block of each reference unit is first written to the file B 38 from the text file 35. The compressed block starting location of the compressed text file 34 is related to the tag location in the previously created file A 37, and the corresponding tag location is converted into the compressed block starting location and written to the file B 38. This results in the file B 38 having a data content comprising as many compressed block starting locations along with the ensuing word tuples 38a as the number of the reference units (compressed blocks) involved.

After the file B has been created in the manner described, a control block 28 is reached for another repeat processing. Under control of the control block 28, subsequent process blocks 29 and 30 are carried out repeatedly on all words included in the file B.

In the repeat processing controlled by the control block 28, the process block 29 regards a given word as a key and prepares pairs of the key word and the compressed block starting locations (values) corresponding to that word, The process block 30 collects pairs of the values (the compressed block starting locations) having the same key (word) in order to create a list of sets comprising the keys and their corresponding values. The list is written to a file C. The file C thus provides a list of each word associated with the compressed block starting location of each reference unit in which the word in question appears. Such processing is repeated on all words in the file B under control of the control block 28.

The result is that, as shown in FIG. 3, the file C 39 constitutes a list of every word associated with the compressed block starting locations corresponding to the reference units in which the word in question appears and which are delimited by tags in the text file. Specifically, the file C 39 in FIG. 3 comprises listed data in which a first word 1, a second word 2, etc., are listed as (word 1, 0, . . . )

(word 2, 0, 52, . . . )

The listed data signifies that the first word 1 appears in the reference units whose compressed block starting locations are given as addresses 0, . . . , that the second word 2 appears in the reference units whose compressed block starting locations are identified as addresses 0, . . . , and so on.

Then a process block 28 is reached. The process block 31 prepares, on the basis of the content of the file C, a search index through which to search by word for a set of compressed block starting locations of the reference units, thus completing the processing. The search index for each word has been prepared in the manner described, a search through the search index for a given target word permits an immediate retrieval of the set of the compressed block starting locations of the reference units in which the target word appears. Thus given the set of the compressed block starting locations acquired according to the target word, it is possible to decompress and output the reference units of the applicable compressed blocks for displaying the relevant reference units in accordance with the compressed block starting location set in question.

Although the description above contains many specificities, these should not be construed as limiting the scope of the invention but as merely providing illustrations of the presently preferred embodiment of this invention. For example, whereas the above-described embodiment retrieves and stores all words of structured documents, it is clear that a given category of words alone (e.g., grouped by part of speech) may be selected and stored for subsequent search and retrieval by executing a morphological element parsing processing for extracting words by the word location extracting part 12 except for postpositions, conjunctions or the like which are inapplicable as the target word. In such cases, it is possible to exclude words that may not clearly manifest the characteristic to be searched for. As for the word inflection, an extracted form or canonical form may be accepted so that searching for words can be carried out without cares about the word inflection.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A structured document searching apparatus comprising:

document inputting means for inputting a structured document including a plurality of reference units, adjacent two of which are partitioned by a tag;

dividing means for dividing into said reference units the structured document input by said document inputting means;

compressing means for compressing each of said reference units divided by said dividing means;

first storing means for storing each said compressed reference unit in a location in a storage device;

word extracting means for extracting at least one word from each of said plurality of reference units divided by said dividing means;

tuple generating means for generating tuples that include the locations in said storage device of said compressed reference units that correspond to the reference units from which the extracted words are and said extracted;

search index generating means for generating at least one search index which include said tuples comprising the corresponding compressed reference unit locations and said at least one extracted word; and storing means for storing said at least one search index, in conjunction with a structured document including said compressed reference units.

2. The structured document searching apparatus according to claim 1, further comprising:

searching means which, when a target word is input, searches for said target word in said at least one search index;

decompressing means which, when said searching means detects said target word in said at least one search index, reads said corresponding location from said storing means, and decompresses the corresponding compressed reference unit; and displaying means for displaying the content of said decompressed reference unit.

3. The structured document searching apparatus according to claim 1, wherein said compressing means executes Huffman coding in accordance with type of character used in said structured document input by said document inputting means and frequency of appearance of each character used in said structured document.

4. A structured document searching method for use with a structured document searching apparatus, the method comprising the steps of:

(a) inputting a structured document including a plurality of reference units, adjacent two of which are partitioned by a tag;

(b) dividing into said reference units the structured document;

(c) compressing each of said reference units;

(d) storing each of said compressed reference units in a location in a storage device;

(e) extracting at least one word from each of said reference units;

(f) generating tuples each of which includes the locations of said compressed reference units and said at least one extracted word corresponding to one of said compressed reference units;

(g) generating at least one search index each of which includes said tuples comprising the corresponding compressed reference unit locations and said at least one extracted word; and (h) storing said at least one search index, in conjunction with a structured document including said compressed reference units.

5. The structured document searching method according to claim 4, further comprising the steps of:

(i) searching for a target word in said at least one search index;

(j) reading a compressed reference unit location that corresponds to said at least one extracted word that has been detected as said target word from said stored indexes;

(k) decompressing the corresponding compressed reference unit; and (l) displaying the content of said decompressed reference unit.

6. The structured document searching method according to claim 4, wherein the step (c) executes Huffman coding in accordance with type of character used in said structured document input in the step (a) and frequency in appearance of each character used in said structured document.

* * * * *